US005798588A

United States Patent [19]

Okuyama et al.

[11] Patent Number: 5,798,588

[45] Date of Patent: Aug. 25, 1998

[54] VIBRATING MOTOR, VIBRATING MOTOR CASING AND VIBRATING DEVICE CONTAINING VIBRATING MOTOR

[75] Inventors: Toshihide Okuyama; Masahiro Kaneko, both of Sayama, Japan

[73] Assignee: Sayama Precision Industries Co., Ltd., Sayama, Japan

[21] Appl. No.: 419,279

[22] Filed: Apr. 10, 1995

[30] Foreign Application Priority Data

Apr. 11, 1994 [JP] Japan .................................... 6-098208

[51] Int. Cl.$^6$ ................................ H02K 7/06; F16F 15/22

[52] U.S. Cl. ................................ 310/81; 74/573 R; 74/87

[58] Field of Search .................................... 74/573 R, 87; 366/128; 310/81, 91, 156

[56] References Cited

FOREIGN PATENT DOCUMENTS 6-98496 4/1994 Japan .

*Primary Examiner*—Steven L. Stephan
*Assistant Examiner*—Michael J. Wallace, Jr.
*Attorney, Agent, or Firm*—Oblon, Spivak, McCelland, Maier & Neustadt, P.C.

[57] ABSTRACT

In a vibrating motor, an eccentric weight is attached to one end of a rotation shaft that projects linearly from a motor housing. The vibrating motor causes the gravity center of the weight to rotate about the rotation shaft so as to produce a vibration. A disk-shaped anti-bending piece is provided on the rotation shaft coaxial with it. This anti-bending piece faces an anti-bending surface provided on some kind of supporting member when the housing is supported by the member, the piece being situated at a predetermined distance from this surface. If the shaft bends, the piece strikes the surface and the linear shape of the shaft is restored due to its own elasticity. Hence, even if the motor suffers an unexpected load, the rotation shaft does not buckle due to the weight of the eccentric weight.

15 Claims, 11 Drawing Sheets

PA
2
C1
10
14
10a
18
16
12
15
18
C1
10a
11
13
2

VIBRATING MOTOR, VIBRATING MOTOR CASING AND VIBRATING DEVICE CONTAINING VIBRATING MOTOR

BACKGROUND OF THE INVENTION

1. Field of the Invention

This invention relates to a vibrating device comprising a rotating body formed by attaching an eccentric weight to the linear rotation shaft of a vibrating motor, and producing a vibration when the gravity center of the eccentric weight revolves around the rotation shaft.

2. Prior Art

Vibrating devices may for example, as shown in FIG. 20, comprise a vibrating motor 104 wherein a semi-cylindrical eccentric weight 103 is attached to a rotation shaft 102 that projects linearly from a motor housing 101, and this weight 103 is caused to rotate. In this vibrating motor 104, when the eccentric weight 103 rotates together with the rotation shaft 102, the gravity center of the weight 103 revolves around the shaft 102 so as to produce a vibration. This type of vibrating motor can be made compact, and is used as a vibration source in portable shoulder massagers or the receivers of paging devices.

In this vibrating motor 104, if the motor receives a severe shock as when the motor is dropped for example, the rotation shaft 102 will buckle on its bearings in the motor housing 101 under the weight of the eccentric weight 103. If the bent shaft 102 is then rotated, as the gravity center of the eccentric weight 103 has been displaced, the desired vibration may no longer be obtained, and there is a risk that it may collide with electronic components or circuit boards disposed around the weight 103 so that they become damaged.

In particular, when the vibrating motor is used in a pager, it is generally made compact while at the same time, it is desired to increase the vibration produced by the motor. As a result, the shaft diameter of the rotating shaft carrying the eccentric weight tends to be made smaller, the eccentric weight tends to be made heavier, and there is a greater risk that the rotation shaft will buckle. These problems are even more serious in card type pagers whereof the casing has a thickness of about 5 mm.

In Japanese Patent Tokkai Hei 6-98496, a method is disclosed wherein a motor cover containing the eccentric weight is attached to the edge of the motor housing, and one end of the rotation shaft is supported by the front wall of the cover. The rotation shaft is thereby firmly supported in two places from both sides of the eccentric weight by the motor housing and the front wall of the cover, so that even if the vibrating motor suffers a severe shock, the rotation shaft will probably not buckle due to the eccentric weight.

This method however requires parts such as bearings that have to be embedded in the motor cover or its front wall, hence the structure of the motor becomes more complex and manufacturing costs increase. Further, due to the increase in the number of bearings, the drive force of the rotation shaft may be wasted due to friction, etc.

SUMMARY OF THE INVENTION

In view of the aforesaid problems, this invention aims to provide a vibrating motor wherein the rotation shaft to which an eccentric weight is attached does not buckle even if the motor suffers a severe shock, as for example when the motor is dropped. Further, this invention aims to provide a casing, for example a pager housing, that is required to accommodate the motor. Still further, this invention aims to provide a vibrating device to which such a motor is applied.

In order to achieve the aforesaid objectives, the Inventors performed various experiments. As a result, it was found that if the bending deformation of the rotation shaft is limited so that it does not exceed the elastic limit, the shaft returns to its original shape due to its own elasticity. The Inventors conceived this invention based on the results of these experiments.

According to a first aspect of the invention, in a vibrating motor wherein an eccentric weight is attached to a linear rotation shaft projecting from a motor housing, and the gravity center of this weight is made to revolve around the rotation shaft so as to produce a vibration, the shaft is provided with a coaxial disk-shaped anti-bending piece. When the motor housing is supported by some kind of supporting member, this anti-bending piece is disposed facing an anti-bending surface on the supporting member at a predetermined distance away from the surface. If the rotation shaft bends, the anti-bending piece strikes the aforesaid anti-bending surface so that the linear shape of the rotation shaft is restored due to its elasticity.

According to this first aspect, when the motor housing is supported by some kind of supporting member, the anti-bending piece faces the anti-bending surface on the supporting member at a predetermined distance away from it. If the rotation shaft bends due to some shock to the vibrating motor, the anti-bending piece strikes the shaft anti-bending surface. This anti-bending surface restricts the bending of the rotation shaft to within its elastic limit, hence the shaft returns to its linear shape due to its own elasticity. A vibrating motor that is resistant to severe shocks, such as are for example caused by dropping the motor, can therefore be provided.

According to a second aspect of the invention, in a vibrating casing housing a vibrating motor wherein an eccentric weight is attached to a linear rotation shaft projecting from a motor housing, and a rotating body rotates so that the gravity center of this weight revolves around the rotation shaft to produce a vibration, a shaft anti-bending surface is formed in the casing facing a part of the aforesaid rotating body having a circular cross-section at a predetermined distance away from the part so that the part strikes the surface when the shaft bends, and bending of the shaft beyond its elastic limit is prevented.

According to this second aspect, when the vibrating motor is installed in the casing, the part of the rotating body having a circular cross-section that rotates together with the rotation shaft of the vibrating motor, faces the shaft anti-bending surface of the casing at a predetermined distance away from it. When the shaft bends due to some shock to the casing, the part having a circular cross-section strikes the shaft anti-bending surface. The shaft anti-bending surface restricts the bending of the shaft to within its elastic limit, so the linear shape of the shaft is restored due its elasticity. Due to the combined effect of the casing, therefore, a vibrating motor that is resistant to severe shocks, such as are for example caused by dropping the motor, can be provided.

According to a third aspect of the invention, in a vibrating device wherein an eccentric weight is attached to a linear rotation shaft of a vibrating motor so as to form a rotating body, and the gravity center of this weight is made to revolve around the rotation shaft so as to produce a vibration, this device is provided with a shaft anti-bending surface that encloses a part having a circular cross-section of the rotating body at a predetermined distance away from it. If the rotation shaft bends, this surface strikes the part having a circular cross-section so that the linear shape of the shaft is restored due to its elasticity.

According to this third aspect, if the rotation shaft bends due to some shock to the vibrating device, the part having a circular cross-section strikes the shaft anti-bending surface. This shaft anti-bending surface restricts the bending of the rotation shaft to within its elastic limit, hence the shaft returns to its linear shape due to its own elasticity. A vibrating device that is resistant to severe shocks, such as are for example caused by dropping the motor, can therefore be provided.

The aforesaid and other objects, features and advantages of the invention will become apparent from the following description of preferred embodiments with reference to the attached drawings.

DESCRIPTION OF THE PREFERRED EMBODIMENTS

Some preferred embodiments of this invention will now be described with reference to the attached drawings.

Figure 1:
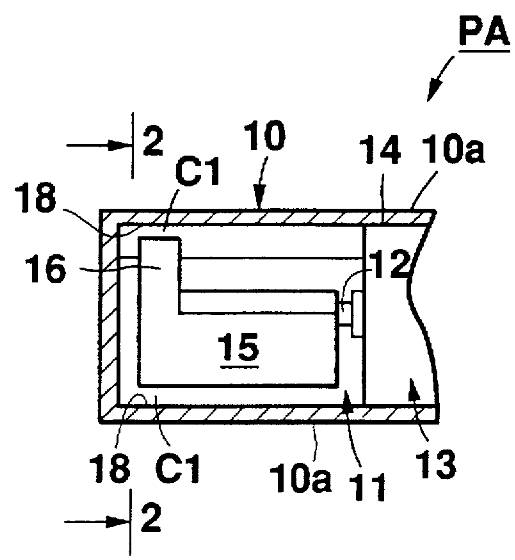
FIG. 1 is a vertical section showing part of a pager wherein a vibrating device according to a first embodiment of this invention is applied.
Figure 2:
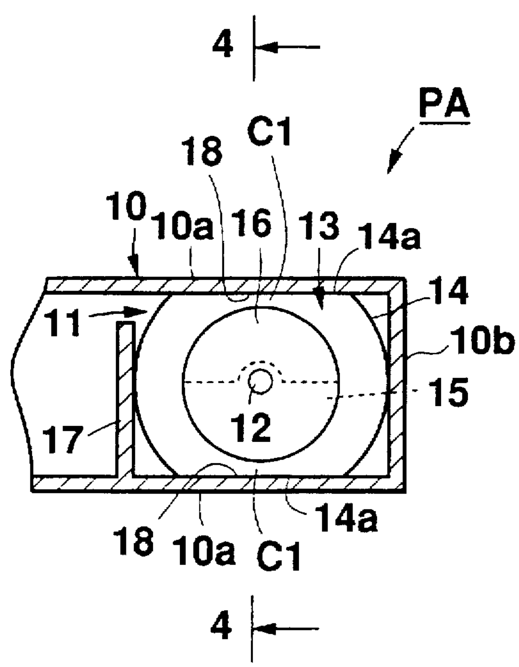
FIG. 2 is a vertical section taken along a line 2—2 in FIG. 1.

FIG. 1 and FIG. 2 show part of a pager to which a vibrating device according to a first embodiment of this invention has been applied. The pager PA comprises a pager casing 10 that functions as a casing for housing an electrical circuit such as a receiver circuit, not shown. A vibrating device 11 is installed inside this casing 10, this device 11 vibrating when the electrical circuit receives a signal. Due to this vibration, the whole of the pager casing 10 vibrates so as to alert the owner of the pager that a signal has been received.

The vibrating device 11 comprises a vibrating motor 13 that rotates about a rotation shaft 12 when an electric current is supplied. This vibrating motor 13 comprises a motor housing 14 that houses a rotor, not shown, fixed to the shaft, and a stator, not shown, which generates a magnetic field that causes the rotor to rotate. A semi-cylindrical eccentric weight 15 is attached to one end of the shaft 12 that projects linearly from the housing 14. When a rotating body comprising the shaft 12 rotates, the gravity center of the weight 15 rotates around the shaft 12, and the whole of the vibrating motor 13 therefore vibrates.

A coaxial disk-shaped anti-bending piece 16 is provided on the shaft 12. This anti-bending piece 16 is disposed adjacent to the weight 15 at the end of the shaft 12.

The pager casing 10 functions as a supporting member that supports the motor housing 14. A pair of slice surfaces 14*a* of the motor 13 are gripped by a pair of lateral walls 10*a* of the pager casing. The motion of the motor 13 along the lateral walls 10*a* is fully restricted by an end wall 10*b* joining the lateral walls 10*a*, and an inner wall 17 provided on one of the lateral walls 10*a*.

When the motor 13 is assembled in the pager casing 10, a shaft anti-bending surface 18 is provided facing a part of the rotating body of the motor 13 having a circular cross-section, i.e. facing the bending piece 16, at a predetermined distance C1 away from it. If the motor 13 suffers a severe shock for some reason and the shaft 12 bends, the anti-bending piece 16 strikes the anti-bending surface 18. Due to this impact, the shaft anti-bending surface 18 prevents the shaft 12 from bending beyond its elastic limit, and the shaft 12 is restored to its linear shape by its own elasticity. Therefore, even if the pager is erroneously dropped so that the weight 15 suffers a severe shock, the shaft 12 of the motor 13 does not remain bent.

According to this embodiment, the shaft anti-bending surface 18 consists of the pair of lateral walls 10*a* of the pager casing 10, however the shaft anti-bending surface preferably takes the form of a cylinder surrounding the anti-bending piece 16 at the same distance from the piece 16 over its whole circumference. If this approach is adopted, buckling of the shaft 12 can be prevented whatever the direction of a shock suffered by it.

Figure 3:
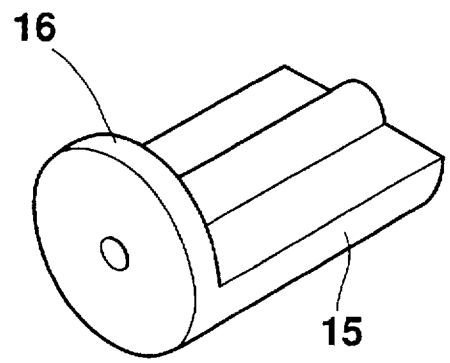
FIG. 3 is a perspective view of an eccentric weight and anti-bending piece.
Figure 4:
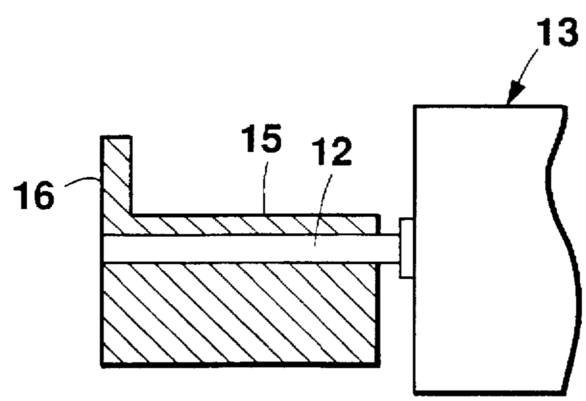
FIG. 4 is a partial section of an eccentric weight and anti-bending piece taken along a line 4—4 in FIG. 2.
Figure 5:
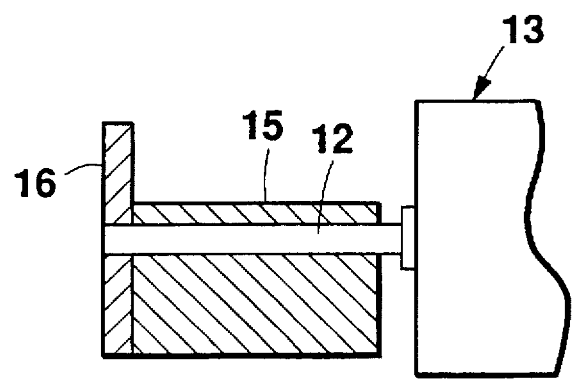
FIG. 5 is a partial section of an eccentric weight and anti-bending piece similar to that of FIG. 4.

If the piece 16 is formed with the same diameter as the weight 15 as shown in FIG. 3, the piece 16 must strike the surface 18 before the weight 15 comes into contact with the surface 18. This arrangement ensures correct functioning of the device while achieving maximum compactness. The design may be simplified by forming the piece 16 in a one-piece construction with the weight 15 as shown in FIG. 4, but if it is made as a separate body from the weight 15 as shown in FIG. 5, it may easily be fitted to an existing motor 13.

Figure 6:
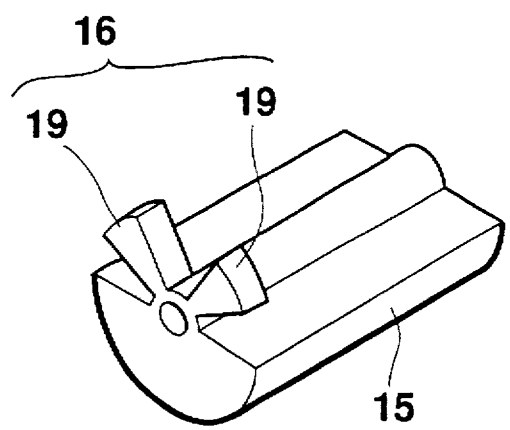
FIG. 6 is a perspective view showing another example of an anti-bending piece.
Figure 7:
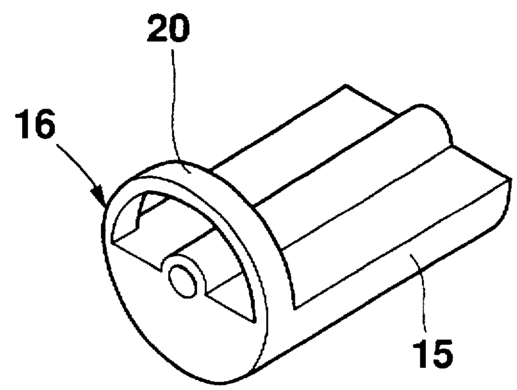
FIG. 7 is a perspective view showing still another example of an anti-bending piece.

It is not absolutely necessary that the outer circumference of the disk forming the piece 16 is continuous, and part of the disk may be cut away to form a fan shape whereof contact parts 19 come into contact with the surface 18 as shown in FIG. 6. Alternatively, part of the disk may be cut away to form a half ring-shaped arch 20 that strikes the surface 18, as shown in FIG. 7. In all of these cases, an imbalance is produced in the piece 16, and by making it have the same effect as that of the weight 15, the composite body formed from the piece 16 and weight 15 may be made compact.

Figure 8:
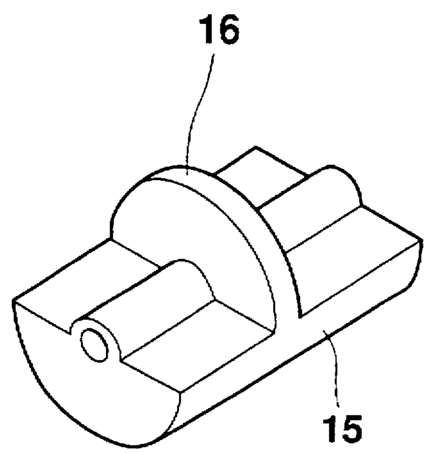
FIG. 8 is a perspective view showing still another example of an anti-bending piece.

The piece 16 is not necessarily situated nearer the end of the shaft 12 than the weight 15 as shown in FIG. 3, and instead may be installed in the middle region of the weight 15 in the direction of the shaft 12 as shown in FIG. 8. However, there is no need to insist on these arrangements, and the piece 16 may also be installed nearer the housing 14 of the weight 15 or in a plurality of positions.

Figure 9:
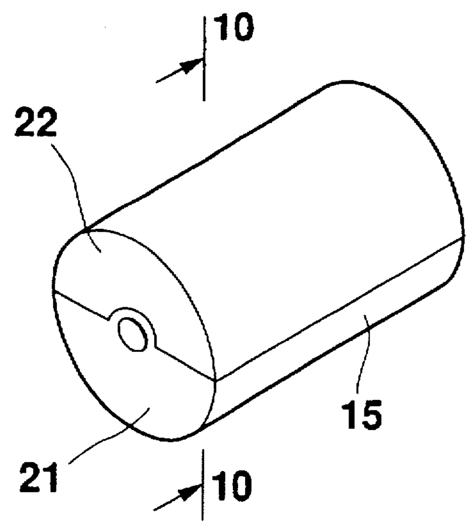
FIG. 9 is a perspective view showing an anti-bending piece according to a second embodiment of this invention.
Figure 10:
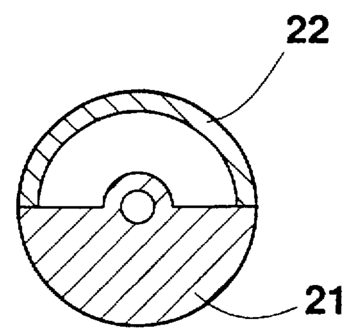
FIG. 10 is a section taken along a line 10—10 of FIG. 9.

FIG. 9 and FIG. 10 show a second embodiment of this invention. This second embodiment is characterized in that the part of the rotating body having a circular cross-section is formed by joining a semi-cylindrical anti-bending piece 22 to a semi-cylindrical weight 21. According to this construction, the part having a circular cross-section formed from the weight 21 and piece 22 faces the shaft anti-bending surface at a predetermined distance away from it. Due to the impact of this part having a circular cross-section with the anti-bending surface, bending of the shaft beyond its elastic limit is prevented.

Figure 11:
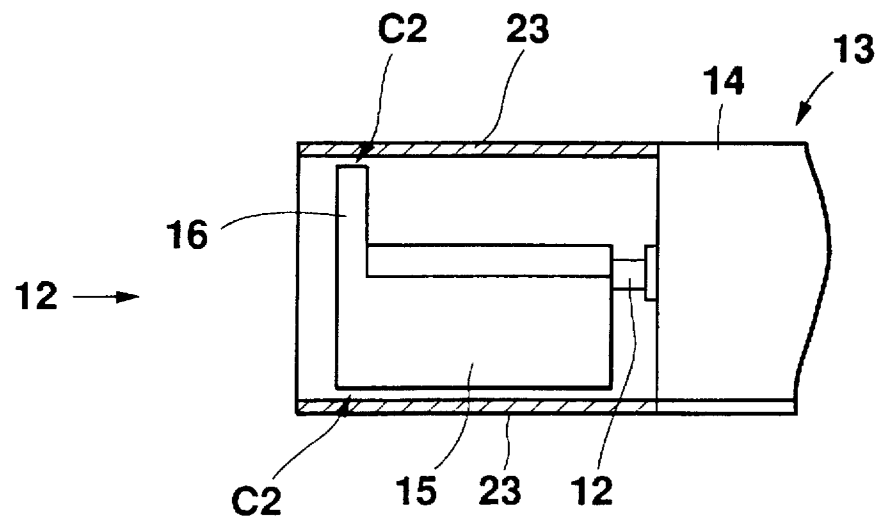
FIG. 11 is a partial vertical section showing a vibrating device according to a third embodiment of this invention.
Figure 12:
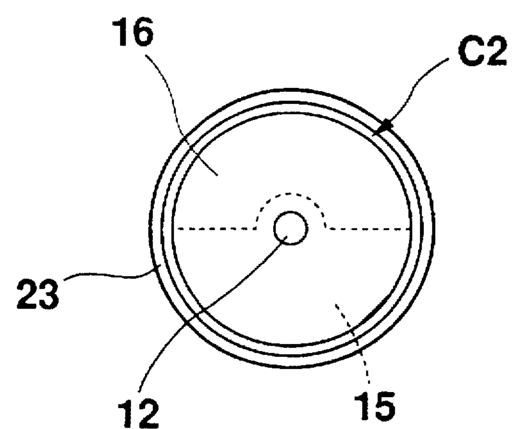
FIG. 12 is an end view of a vibrating motor from a direction shown by an arrow 12 in FIG. 11.

FIG. 11 and FIG. 12 show a third embodiment of this invention. This third embodiment is characterized in that an extension 23 is provided at the end of the housing 14 and continuous with its circumferential wall so as to surround the piece 16 while maintaining a predetermined gap C2 away from it. According to this construction, the extension 23 forms a shaft anti-bending surface, and prevents bending of the shaft 12 of the motor 13 beyond its elastic limit. Moreover, as the shaft anti-bending surface is thereby provided on the body of the motor 13, there is no need to consider assembly errors in relation to the supporting members of the housing 14.

Figure 13:
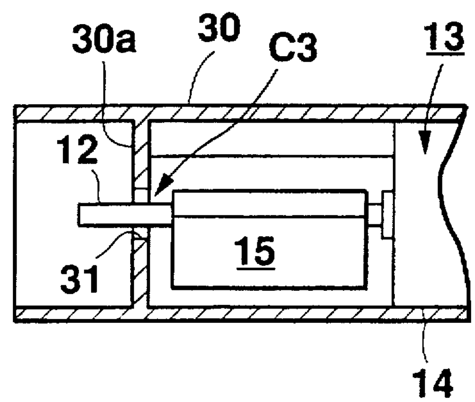
FIG. 13 is a partial vertical section showing a vibrating device according to a fourth embodiment of this invention.

FIG. 13 shows a vibrating device according to a fourth embodiment of this invention. This fourth embodiment is characterized in that a circular aperture 31 through which one end of the shaft 12 of the motor 13 passes, is provided in a pager casing 30 according to this invention.

As will be understood from FIG. 13, a semi-cylindrical weight 15 is attached to the shaft 12 of the motor 13 that projects linearly from the housing 14. A wall **30*a* is provided in the casing 30 that houses the motor 13, and the aperture 31 is provided in this wall 30*a*. When the motor 13 is assembled in the casing 30, one end of the shaft 12 passes through the aperture 31 so that it protrudes. The aperture 31 faces the outer circumferential surface of the shaft 12** at a predetermined distance C3 away from it.

According to this construction, the inner surface of the aperture 31 functions as a shaft anti-bending surface. If the shaft 12 bends due to a severe shock, the shaft 12, which forms part of a rotating body having a circular cross-section, strikes the inner surface of the aperture 31, so the aperture 31 prevents bending of the shaft 12 beyond its elastic limit. In this type of pager casing 30, the shaft itself functions as an anti-bending piece, hence buckling of the shaft 12 may be prevented by making only a minor modification to the shaft contour of an existing motor.

Figure 14:
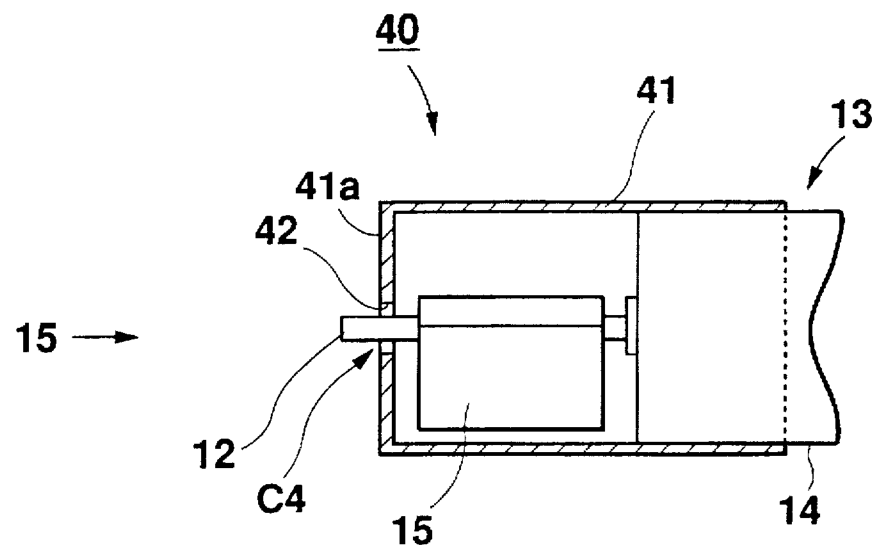
FIG. 14 is a partial vertical section showing a vibrating device according to a fifth embodiment of this invention.
Figure 15:
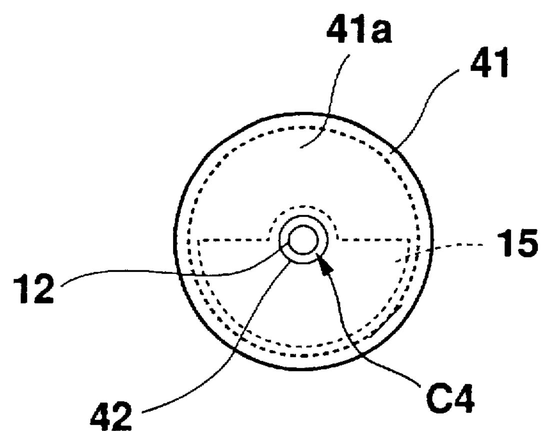
FIG. 15 is an end view of a vibrating motor from a direction shown by an arrow 15 in FIG. 14.

FIG. 14 and FIG. 15 depict a vibrating device according to a fifth embodiment of this invention. A vibrating device 40 comprises a motor cover 41 housing a weight 15 attached to the front end of the motor 13. A circular aperture 42 is provided in a front wall **41*a* of the cover 41. One end of the shaft 12 of the motor 13 passes through this aperture 42, and the inner circumferential surface of the aperture 42 functions as a shaft anti-bending surface facing the shaft 12** at a predetermined distance C4 away from it.

Figure 16:
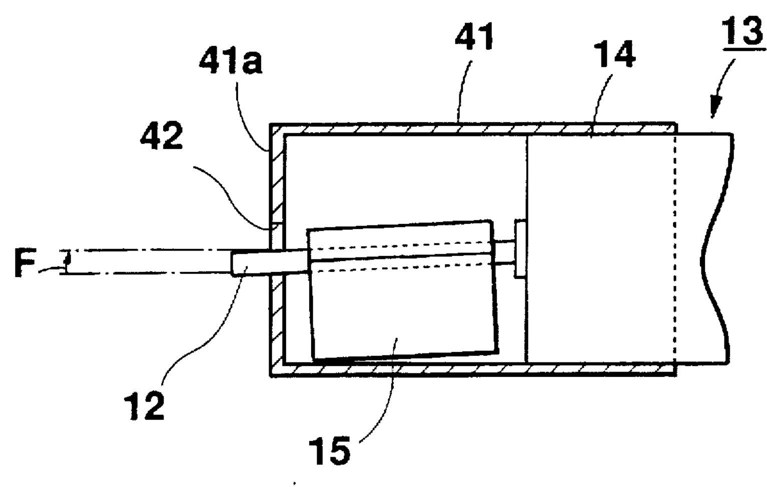
FIG. 16 is a drawing showing the effect of a shaft anti-bending surface.

If the weight 15 suffers a severe shock as when for example the motor 13 is dropped, the shaft 12 buckles on its bearings in the housing 14, as shown in FIG. 16. The end of the shaft 12, which forms part of a rotating body having a circular cross-section, then strikes the inner surface of the aperture 42 in the front wall **41*a* of the cover 41. The inner surface of the aperture 42 prevents deformation of the shaft 12 beyond its elastic limit, so its original linear shape is recovered due to its own elastic force F. As a result, the shaft itself functions as an anti-bending piece. Buckling of the shaft 12 carrying the weight 15 may thus be prevented simply by joining the cover 41 to the housing 14**.

Figure 17:
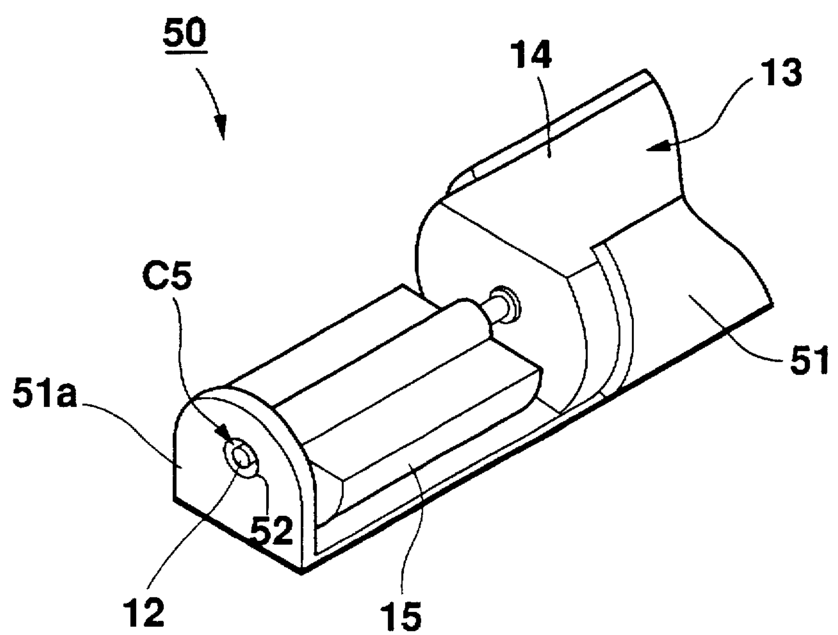
FIG. 17 is a perspective view showing a vibrating device according to a sixth embodiment of this invention.

FIG. 17 shows a sixth embodiment of this invention. A vibrating device 50 comprises a motor holder 51 that fixes the motor housing 14 so as to fix the motor 13 to a pager housing or the like. A front wall **51*a* is provided in front of the weight 15 in the holder 51. A circular aperture 52 is provided in this front wall 51*a*, and one end of the shaft 12 of the motor 13 passes through this aperture 52. The inner circumferential surface of the aperture 52 functions as a shaft anti-bending surface facing the shaft 12, which is a part having a circular cross-section, at a predetermined distance C5 away from it. The shaft itself therefore functions as an anti-bending piece, and the shaft 12** is prevented from bending beyond its elastic limit.

Figure 18:
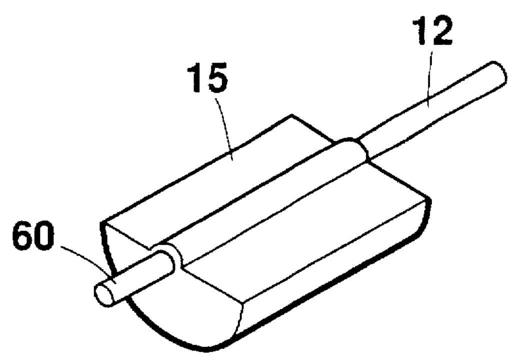
FIG. 18 is a perspective view showing an anti-bending piece according to a seventh embodiment of this invention.

FIG. 18 shows a seventh embodiment of this invention. This embodiment is characterized in that a shaft piece 60 that is coaxial with the shaft 12 of the motor 13 is provided in the front end face of the weight 15. This shaft piece 60 functions as part of a rotating body having a circular cross-section and as an anti-bending piece. The same effect is achieved by this construction as by those of the preceding embodiments.

Figure 19:
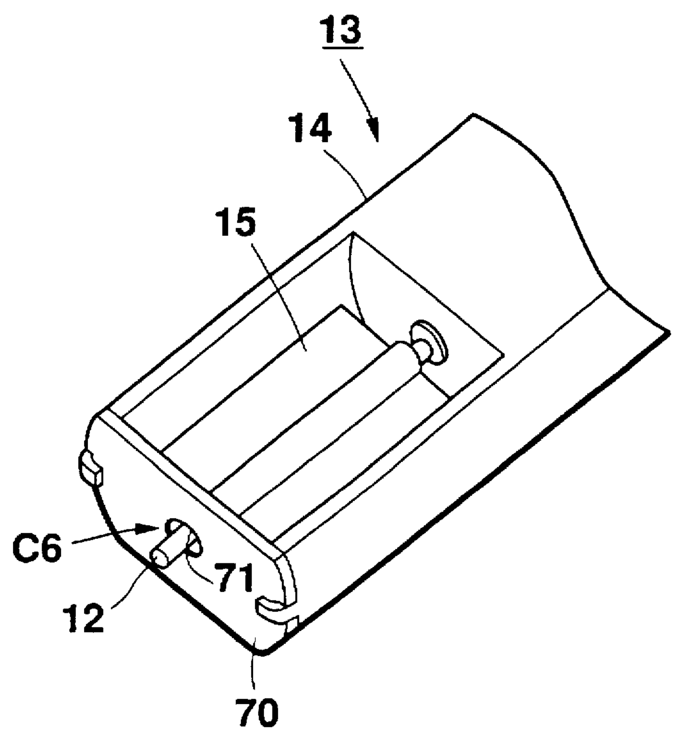
FIG. 19 is a perspective view showing a vibrating device according to an eighth embodiment of this invention.
Figure 20:
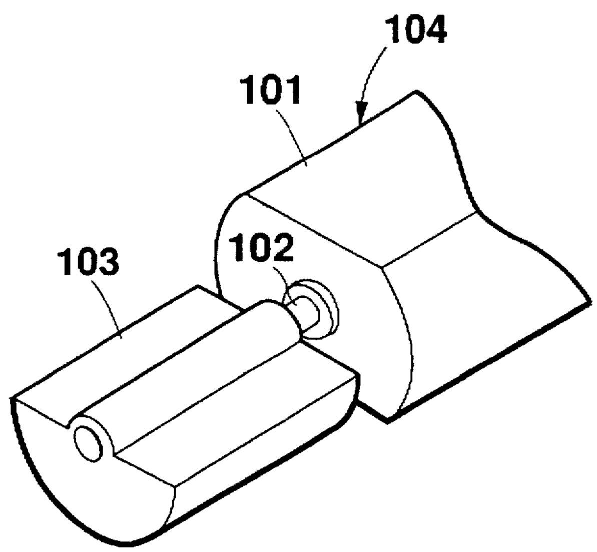
FIG. 20 is a perspective view showing part of a conventional vibrating motor.
Figure 21:
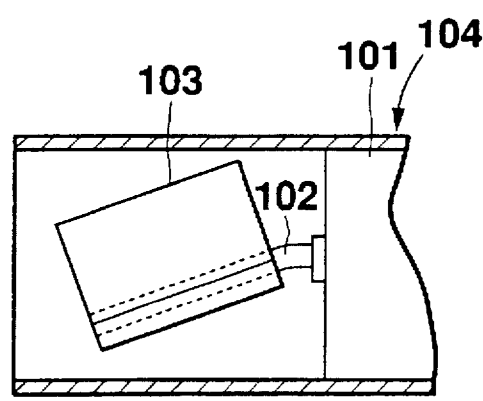
FIG. 21 is a partial section of a vibrating motor showing a rotation shaft that has suffered plastic deformation.

FIG. 19 shows an eighth embodiment of this invention. The eighth embodiment is characterized in that the motor housing 14 is extended, and a contact plate 70 is attached to its front end by caulking. A circular aperture 71 is provided in this contact plate 70, and one end of the shaft 12 of the motor 13 passes through this aperture 71. The inner circumferential surface of the aperture 71 functions as a shaft anti-bending surface facing the shaft 12, which forms a part having a circular cross-section, at a predetermined distance C6 away from it. The shaft itself therefore functions as an anti-bending piece, and the shaft 12 is prevented from bending beyond its elastic limit.

The aforesaid embodiments have been described in the case of a vibrating motor for use with a pager, however this invention also has wide application as a vibrating source for shoulder massagers or as a vibrating alarm mechanism for other portable communications devices. It is particularly suitable for compact motors having a rotation shaft of small diameter, such as a coreless motor for example.

What is claimed:

1. A vibrating motor comprising:

a motor housing supported by a supporting member;

a rotation shaft projecting from said motor housing;

an eccentric weight attached to said rotation shaft providing a vibration when the center of gravity of said weight is rotated around said rotation shaft; and a disk-shaped anti-bending piece coaxially provided on said shaft having a peripheral surface facing an anti-bending surface provided on the supporting member at a predetermined distance from the anti-bending surface wherein said peripheral surface of said piece strikes the anti-bending surface, when said shaft bends, in order to restore the linear shape of said shaft by its own elasticity.

2. A vibrating motor as defined in claim 1 wherein said anti-bending piece radially extends from the rotation shaft with the same radius as said eccentric weight.

3. A vibrating motor as defined in claim 2 wherein said anti-bending piece is formed in a one-piece construction with said weight.

4. A vibrating motor as defined in claim 3 wherein said anti-bending piece is located adjacent said weight on one end of said shaft.

5. A vibrating motor as defined in claim 3 wherein said anti-bending piece is provided in the middle region of said weight in the direction of said shaft.

6. A vibrating motor as defined in claim 1 wherein said anti-bending piece comprises a fan-shaped contact part formed by cutting away part of said disk.

7. A vibrating motor as defined in claim 1 wherein said anti-bending piece comprises a semi-ring shaped arch part formed by cutting away part of said disk.

8. A casing housing a vibrating motor, said motor including a motor housing and a rotation shaft, said rotation shaft projecting linearly from said motor housing;

an eccentric weight attached to said rotation shaft, said casing vibrates when said motor rotates said rotation shaft to thereby rotate the center of gravity of said eccentric weight around said rotation shaft;

said eccentric weight including a rotating body, said rotating body including a part having a circular cross-section, and said casing comprises an anti-bending surface facing said part of said rotating body having a circular cross-section at a predetermined distance away from it so that if said shaft bends, said strikes said anti-bending surface so as to prevent said shaft from bending beyond its elastic limits.

9. A casing as defined in claim 8 wherein a circular aperture is provided through which one end of said shaft passes, and the inner circumferential surface of said aperture is used as said anti-bending surface.

10. An anti-vibrating device comprising a linear rotation shaft, an eccentric weight attached to said linear rotation shaft so as to form a rotating body, a vibration is produced when the center of gravity of said weight is made to rotate around said shaft, said rotating body including a part having a circular cross-section, and said device including a shaft anti-bending surface that surrounds said part of said rotating body having a circular cross-section at a predetermined distance away from it, said part striking said anti-bending surface if said shaft bends such that the linearity of said shaft is restored due to its own elasticity.

11. A vibrating device as defined in claim 10 wherein said part having a circular cross-section is said rotation shaft.

12. A vibrating device as defined in claim 11 wherein a circular aperture is provided in the front wall of a motor cover housing said weight attached to the front end of a motor, one end of said shaft passes through said aperture, and the inner circumferential surface of said aperture is used as a shaft anti-bending surface.

13. A vibrating device as defined in claim 11 wherein a circular aperture, through which one end of the motor rotation shaft passes, is provided in a motor holder supporting the motor, and the inner circumferential surface of said aperture is used as a shaft anti-bending surface.

14. A vibrating device as defined in claim 10 wherein said weight is attached to one end of said rotation shaft projecting from said motor housing, a shaft piece extending from said weight is formed coaxial with said shaft, and said piece is used as said part having a circular cross-section.

15. A vibrating device as defined in claim 10 wherein said weight is formed in a semi-cylindrical shape, and a semi-cylindrical member is joined to said weight so as to form a cylinder surrounding said rotation shaft.

* * * * *